Nov. 10, 1970  Y. J. PELENC  3,539,843
LINEAR INDUCTION MOTOR
Filed Aug. 15, 1968  2 Sheets-Sheet 1
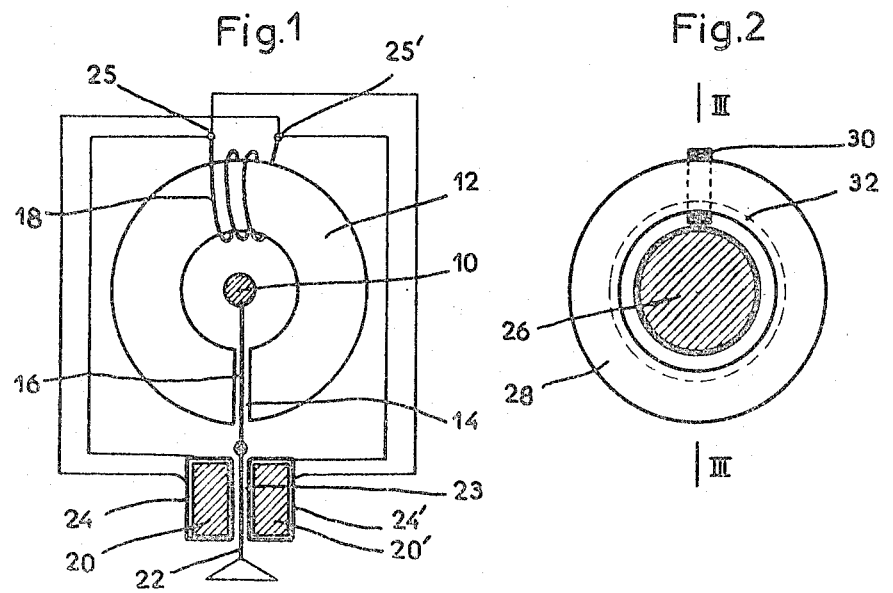
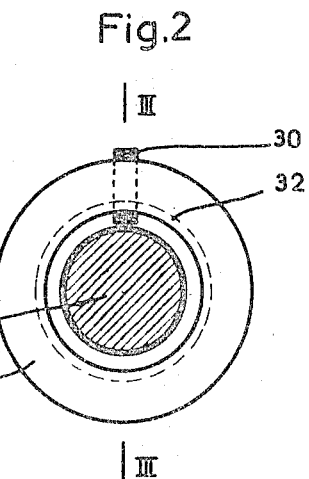
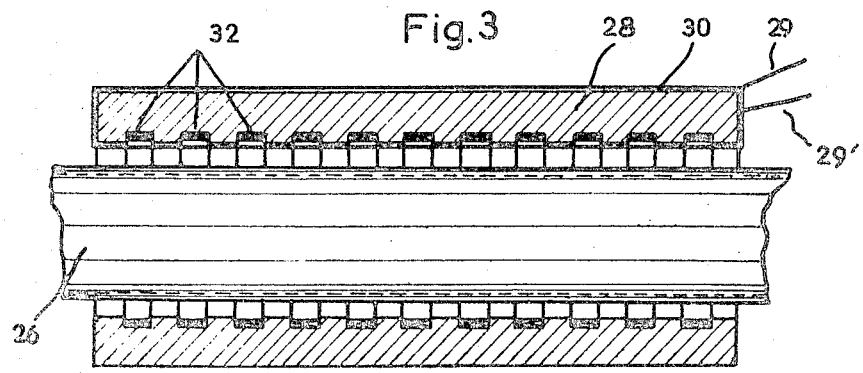
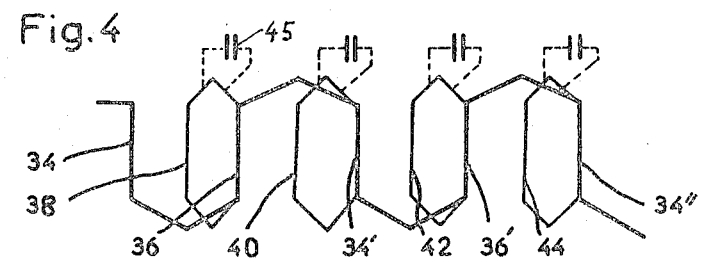
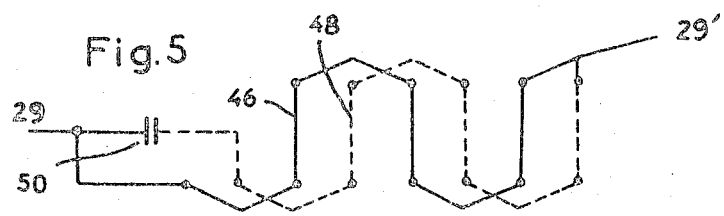

3,539,843
LINEAR INDUCTION MOTOR
Yves J. Pelenc, La Tronche, France, assignor to Merlin Gerin, Société Anonyme, Grenoble, France
Filed Aug. 15, 1968, Ser. No. 752,929
Claims priority, application France, Sept. 1, 1967, 119,804
Int. Cl. H02k 41/02
U.S. Cl. 310—13      8 Claims

ABSTRACT OF THE DISCLOSURE

Linear induction motor comprising a fixed cylindrical conductor surrounded by a movable annular magnetic core member and surrounding a magnetic return structure. Two windings are disposed in the core member, one for supplying current to the second when the conductor is energized by an alternating current, the second winding producing a magnetic traveling field cooperating with said conductor which operates also as an armature so as to move the core member along the conductor.

---

The present invention relates to a linear induction motor comprising a moving magnetic circuit adapted to follow a given path and which is rigidly connected with a field winding which produces a traveling magnetic field cooperating with a stationary armature extending along said path.

It is already known to produce a sliding or traveling field on a moving part of the motor, said field cooperating with a stationary armature, generally of rail shape, which can be extended indefinitely in space. For this purpose, field windings are provided on the moving part.

The advantages of such motors are well known, particularly their low consumption of electrical power, since a traveling field is produced only over a section of short length, but up to now it has been thought that it was necessary to equip the motor either with a source of current connected to the moving part or with feed brushes.

The object of the present invention is to avoid this drawback and to provide a motor which is of particularly simple construction.

The linear motor in accordance with the present invention comprises a stationary electrical conductor extending along the said path and which is connected to a source of alternating current and coupled with the said magnetic circuit so as to excite a secondary winding of said magnetic circuit in known manner, the said secondary winding feeding the said induction winding.

There has already been proposed a sort of sliding transformer which makes it possible to feed the electric motors for the driving of a vehicle by inductive coupling of a coil or loop which is fixed to the vehicle with a stationary electric line and extending along the path of the vehicle. This idea has never found practical application, since it was not known how this inductively collected energy could be effectively utilized.

One therefore has a true transformer with a stationary primary circuit and a movable secondary circuit which feeds the inductor of the linear motor. The absence of a sliding contact or of a brush substantially increases the robustness and reliability of the motor. Furthermore, one gets away from the necessity of the precise positioning of the inductor with respect to the armature.

In accordance with certain developments of the inventive concept, some component elements, either of the transformer part or of the linear motor part, are common. As a result of this relatively intimate combination, it is possible to simplify the overall arrangement and to decrease the cost of manufacture thereof.

The present invention is applicable to a single-phase linear motor or to any multi-phase linear motor.

The inventive magnetic collection arrangement can be utilized in linear motors of very different construction and a few preferred embodiments of such motors will be described now, while it will be obvious to those skilled in the art that various changes and modifications may be made without departing from the spirit and scope of the invention as defined by the appended claims.

In the accompanying drawings:

FIG. 1 is a schematic view in cross-section illustrating the basic principle of a motor in accordance with the present invention;

FIG. 2 is a view similar to FIG. 1 of a first preferred embodiment of a single-phase motor;

FIG. 3 is a section along the line III—III of FIG. 2;

FIG. 4 shows a Frager winding scheme of the motor of FIGS. 2 and 3;

FIG. 5 shows another embodiment of the winding scheme with phase shift by capacitor;

Figure 6:
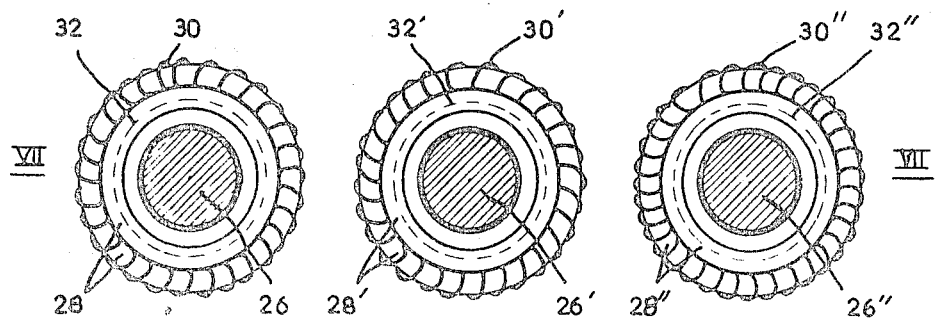
FIG. 6 is a view similar to FIG. 2 of a three-phase motor in accordance with the invention.

In the figures, a wire conductor or fixed line 10 of any cross-section, such as round, square, etc., connected to a source of alternating current (not shown) extends along the path of a moving part of a linear induction motor. A moving magnetic circuit 12 of toric shape surrounds the conductor 10 and is guided by means (not shown) which force it to follow a path parallel to the conductor 10. A gap 14 provided in the magnetic circuit 12 permits passage to support elements 16 of insulating material which bear the line 10. This gap is unnecessary in the case of self-supporting lines 10, that is to say, lines without intermediate supports, or in the case of lines with retractable supports. A secondary winding 18 is wound on a part or all of the magnetic circuit 12. The electric current flowing in the line 10 induces a magnetic flux in the circuit 12, the variations of said flux producing an electromotive force in the winding 18. The assembly constitutes a true transformer whose secondary circuit, consisting of the coil 18, is capable of moving along the path defined by the stationary primary conductor 10. It is to be noted that the electromotive force induced is independent of the speed of movement of the magnetic circuit 12. The moving magnetic circuit 12 is associated with the movable inductor of a linear motor which may be of the short inductor type with two half-inductors 20, 20' cooperating with a long stationary armature 22 having, for instance, the shape of a rail parallel to the line 10 and arranged in an air gap 23. The windings 24, 24' of the half-inductors 20, 20', which may, for instance, be wound in the manner described in the French Patent 1,474,072, are suitably connected to the terminals 25, 25' of the winding 18 of the movable transformer, a phase shift being produced in conventional manner, for instance, by a capacitance (not shown) in order to produce a traveling field in the air gap 23.

The operation of such a motor follows:

At any point of the path of the motor a current is induced in the winding 18 by the alternating current flowing in the line 10. This current is used to feed the moving inductor windings 24, 24' of the linear motor phich produce a traveling field in accordance with the general principle of linear induction motors, thereby causing a displacement of the moving part. It is to be noted that such a motor does not have any rubbing contact or brush for the feeding of the moving parts, they being replaced by electric pick-up by the moving secondary winding 18.

The motor shown in FIG. 1, which does not constitute the preferred embodiment of the invention since it employs a plurality of windings and magnetic circuits, has been described in particular to facilitate an understanding of the principle of operation of the different improved variants shown in the following figures.

Referring now to FIGS. 2 to 5 which show a variant in the case of a single-phase motor, 26 is a wire conductor or line similar to the conductor 10 of FIG. 1 traversed by the feed current. A magnetic circuit 28 is, for instance, formed of a cylindrical sleeve or ring the wall of which consists of magnetic material of a certain thickness, it being placed over the conductor 26 which it surrounds. The magnetic circuit 28 is movable with respect to the conductor 26, its displacement parallel to the latter being guided by suitable means (not shown). A secondary winding or coil 30, the turns of which are arranged in axial planes, surrounds the magnetic circuit 28. Although in FIG. 2 this winding 30 extends over only a portion of the periphery of the cylinder 28, it will be understood that it could extend over the entire periphery thereof. As in the arrangement shown in FIG. 1, a current is produced in the coil 30 by variations of the magnetix flux in the circuit 28, resulting from the alternating current passing through the line 26.

The inner wall facing the conductor 26 of the cylindrical circuit 28 is provided with notches 32 in the form of circular grooves in which there are housed the inductor windings which are suitably connected to each other and to the terminals 29, 29' of the coil 30 so that they produce a traveling field in a manner customary in linear motors. The armature which is subjected to this traveling field consists of the conductor 26 itself. For this purpose, it may advantageously comprise a magnetic material which is, for instance, housed within a non-magnetic conductive tube or it may be developed in any other manner to guide the magnetic flux.

FIGS. 4 and 5 illustrate, by way of example and not of limitation, two types of inductor windings, the first with Frager turns or phase-shift rings and the second with a phase-shift capacitor. For reasons of clarity of the drawing, the windings have been shown linear and formed of a single strand in each notch 32. In FIG. 4, the inductor conductors 34, 36, 34', 36', 34'', etc., are housed in a first series of notches 32 between which there are interposed notches 32 which receive one of the strands 38, 40, 42, 44, etc., of a Frager turn, the other strand of which is housed in the notches which also receive the inductor strands. It is easy to see that each Frager turn surrounds a pole surface, creating a phase shift in said section so as to produce a traveling field. Capacitors 45 (shown in dotted line in the drawing) can be associated in the customary manner with the Frager turns to increase the efficiency thereof.

In FIG. 5, two separate windings 46, 48 are overlapped and housed in notches 32, one being shown in solid line and the other in dashed line in the drawing. These two windings 46, 48 are connected in parallel to the terminals 29, 29' of the coil 30, a phase-shift capacitor 50 being connected in one of the circuits 46, 48.

The operation of the motor of FIGS. 2 to 5 is derived from that of FIG. 1.

The current passing in the single-phase line 26 produces in the coil 30 a secondary current which feeds the inductor windings housed in the notches 32 so as to create a traveling field. This field exerts an action on the conductor 26 which serves as an armature, producing therein induced short-circuit currents or eddy currents and the Laplace forces which result therefrom tend to displace the movable inductor. This operation of the linear motors being well known, it is unnecessary to describe it here in further detail.

It should be noted that this improved motor which has all the advantages of the motor of FIG. 1 is of particularly simple construction and results from a true combination of a transformer having a movable secondary with a linear motor, certain parts of which, such as the magnetic circuit 28 and the conductor 26, are common to both devices. Of course, these parts will be adapted to their functions, the magnetic circuit 28 being, for instance, not laminated in the customary manner but formed of magnetic powders or in two differently laminated concentric layers.

Figure 7:
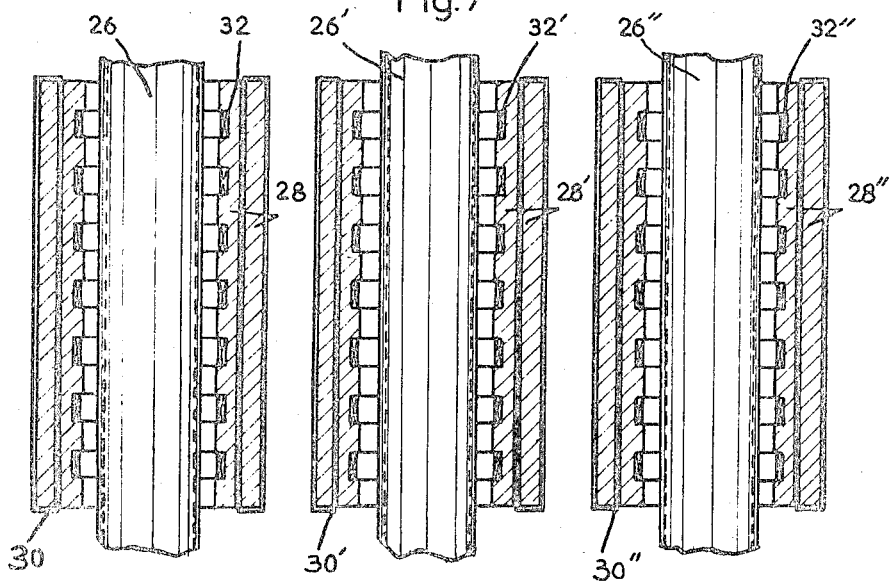
FIG. 7 is a section along the line VII—VII of FIG. 6.
Figure 8:
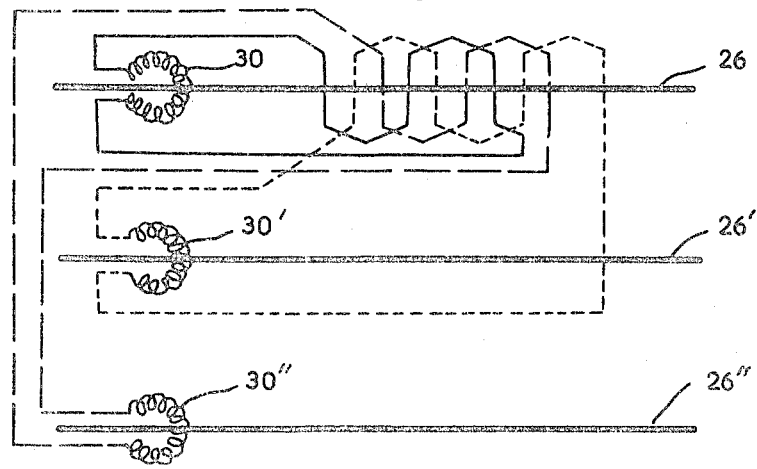
FIG. 8 shows the electrical diagram of the motor of FIGS. 6 and 7, the winding of only a single motor element being shown.

Referring now to FIGS. 6 to 8, there can be noted a three-phase motor derived from the single-phase motor of FIGS. 2 to 5. To facilitate an understanding of the drawing, the same reference numbers designate the same or identical parts as those shown in FIGS. 2 to 5, and are provided with one or two prime marks depending on whether they relate to the second or third phase respectively.

Three phase lines or conductors 26, 26', 26'' are arranged parallel to and spaced from each other and extend along the path of the motor. Each line 26, 26', 26'' is surrounded by a magnetic circuit 28, 28', 28'' similar to that of the single-phase motor of FIG. 2, with secondary winding 30, 30', 30'' of the feed transformer (the windings 30, 30', 30'' have been shown developed over the entire circumference of the magnetic circuit 28, 28', 28''). In each of the series of notches 32, 32', 32'' there are housed three windings staggered in customary manner which are connected to the winding 30 associated with the phase conductor 26, the winding 30' and the winding 30'' respectively. FIG. 8 shows by way of example such an electric winding and connecting diagram, only the winding of the inductor associated with the conductor 26 being shown in order not to unnecessarily clutter the drawing. The circuit of phase I is shown in solid lines, that of phase II in short dashes and that of phase III in long dashes. Such inductor windings produce, in a manner which is well known, a sliding field when they are traversed by a three-phase current. As previously described, this results in a displacement of the moving part consisting of the three magnetic circuits 28, 28', 28'' which are rigidly connected in any known manner (not shown).

It should be noted that the speed of displacement of the moving part has no effect on the electromotive force induced, nor on its frequency.

Of course, the invention is by no means limited to the embodiments which have been more particularly described and shown, but rather extends to any variant embodiment, and in particular that of a multiphase motor with any number of phases, an inductor winding of different structure or else an embodiment in which one inductor is not associated with each of the feed lines.

I claim:

1. A linear induction motor having a magnetic field structure movable along a predetermined linear path formed by an alternating current-energizable stationary linear conductor, said magnetic field structure comprising a core member of magnetic material embracing said conductor, said core member carrying a pick-up winding so that said conductor when energized produces in said core member a magnetic flux linking said pick-up winding, said core member further carrying a field winding electrically connected to said pick-up winding and phase shift means to produce a magnetic field moving in the direction of said conductor and inducing currents in said conductor to cause said magnetic field structure to move along said energized conductor.

2. The linear induction motor of claim 1, wherein said phase shift means comprise shaded pole means.

3. The linear induction motor of claim 1, wherein said phase shift means comprise a split-phase winding.

4. A linear induction motor having a magnetic field structure movable along a predetermined linear path formed by an alternating current-energizable stationary linear conductor, said magnetic field structure comprising a closed ring-shaped magnetic core member surrounding said conductor, a stationary structure of magnetic material extending substantially the entire length of said conductor and spaced radially inwardly from said magnetic core member to define therewith an air gap, said conductor traversing said air gap, a pick-up winding on said magnetic core member arranged to be linked by the magnetic flux induced in said magnetic core member by said conductor when energized, a field winding on said magnetic core member electrically connected to said pick-up winding and extending a length in the direction of said conductor, said field winding being energized by said pick-up winding, and phase shift means cooperating with said field winding to produce a moving magnetic field in said air gap inducing currents in said conductor to cause said magnetic field structure to move along said conductor when said conductor is alternating current energized.

5. The linear induction motor of claim 4, wherein said field winding extends in tranverse circular notches of the inner surface of said magnetic core member.

6. A linear induction motor comprising a tubular stationary alternating current energizable conductor, a mass of magnetic material disposed within said conductor and extending substantially along the entire length of said conductor, a tubular magnetic core member surrounding said conductor in radially outwardly spaced apart relation, said magnetic core member being movable along said conductor, a first winding on said magnetic core member, said first winding having turns extending substantially in axial planes of said magnetic core member, a second winding on said magnetic core member, said second winding having turns extending substantially transversely said turns of said first winding and staggered in the direction of said conductor, said first winding having terminals electrically connected to said second winding to energize said second winding, and phase shift means cooperating with said second winding to produce a moving magnetic field inducing curernts in said conductor and causing said magnetic core member to move along said conductor when said conductor is alternating current energized.

7. The linear induction motor of claim 6, wherein said phase shift means comprise a capacitor split-phase winding.

8. A polyphase linear induction motor comprising a plurality of spaced apart parallel stationary conductors, said conductors being polyphase energizable, a plurality of generally ring-shaped magnetic structures surrounding said conductors and movable as a unit along said conductors, each magnetic structure carrying a single phase pick-up winding in magnetic induction relation with the associated conductor, at least one of the magnetic structures comprising a polyphase field winding adapted to produce when energized a moving magnetic field inducing in the associated conductor currents causing said one of the magnetic structures to move along its associated conductor, said polyphase field winding being electrically connected to and polyphase-energized by said single phase pick-up windings.

References Cited

UNITED STATES PATENTS

| 448,598 | 3/1891 | Wheeler et al. | 310—13 |
| 2,404,984 | 7/1946 | Powers | 310—13 XR |
| 3,001,115 | 9/1961 | Gendreu et al. | 318—137 |
| 783,001 | 2/1905 | Wagner | 310—13 |
| 3,135,879 | 6/1964 | Baumann | 310—13 |
| 3,356,041 | 12/1967 | Bliss | 310—12 |
| 2,337,430 | 12/1943 | Trombetta | 310—13 |

FOREIGN PATENTS

| 31,694 | 7/1967 | Great Britain. |
| 414,471 | 1946 | Italy. |
| 361,098 | 12/1905 | France. |

WARREN E. RAY, Primary Examiner

B. A. REYNOLDS, Assistant Examiner

310—14